J. F. WHITE.
ELECTROMECHANICAL PLAYER FOR MUSICAL INSTRUMENTS.
APPLICATION FILED NOV. 13, 1908.

1,088,499.

Patented Feb. 24, 1914.

9 SHEETS—SHEET 1.

Fig. 1.

J. F. WHITE.
ELECTROMECHANICAL PLAYER FOR MUSICAL INSTRUMENTS.
APPLICATION FILED NOV. 13, 1908.
1,088,499.
Patented Feb. 24, 1914.
9 SHEETS—SHEET 2.
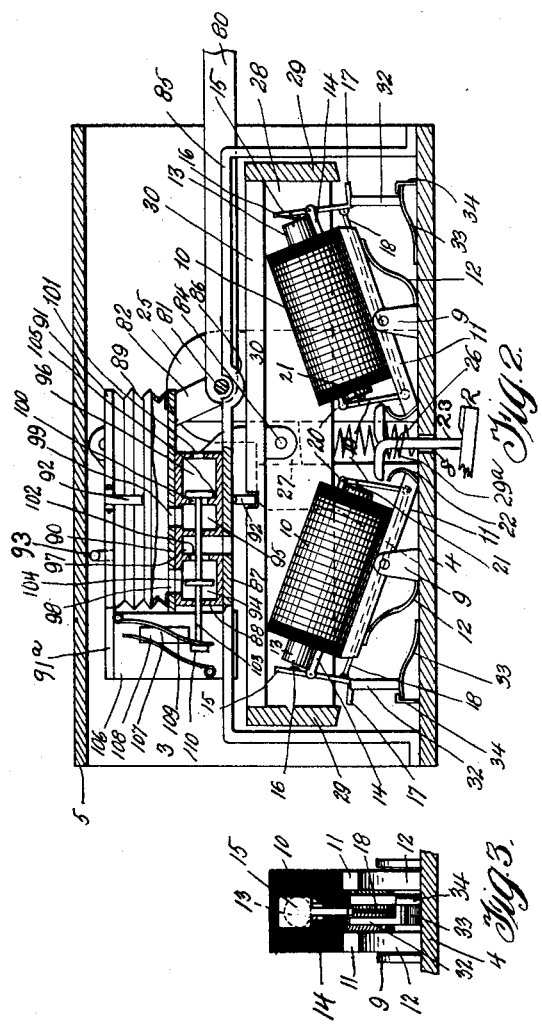
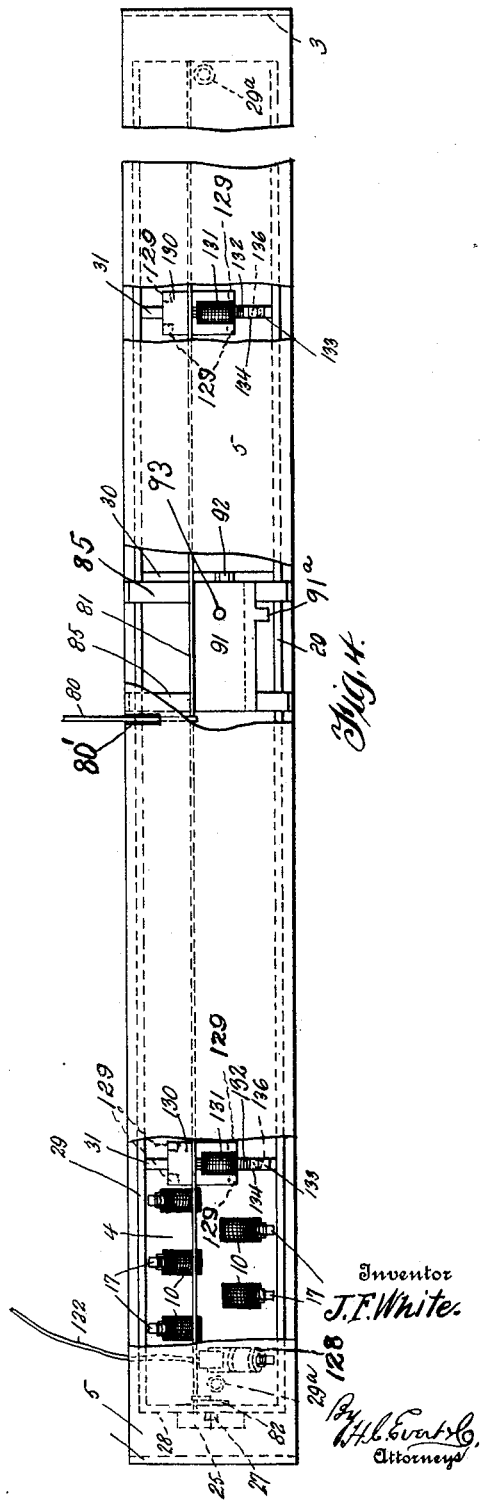
Witnesses
Samuel Payne
N. H. Butler
Inventor
J. F. White.
Attorneys

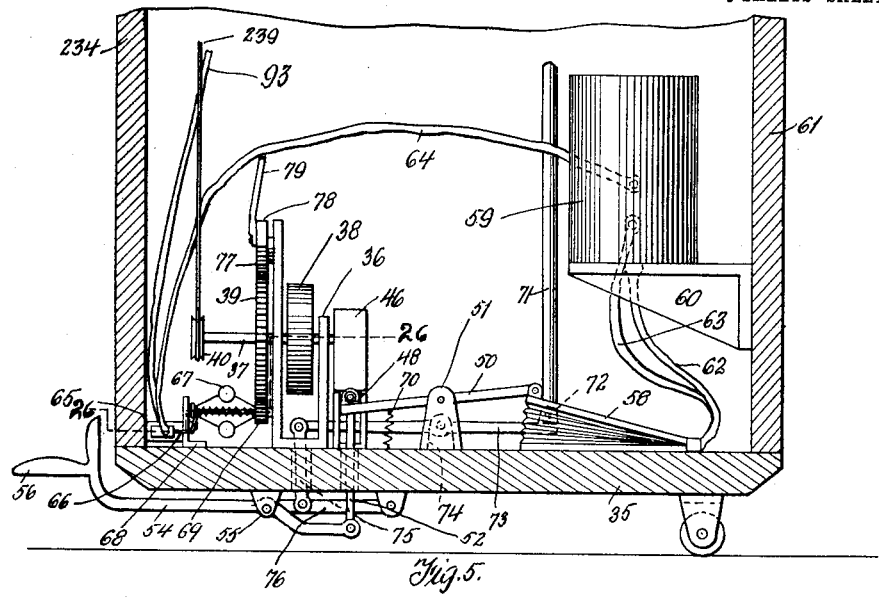

J. F. WHITE.
ELECTROMECHANICAL PLAYER FOR MUSICAL INSTRUMENTS.
APPLICATION FILED NOV. 13, 1908.
1,088,499.
Patented Feb. 24, 1914.
9 SHEETS—SHEET 4.
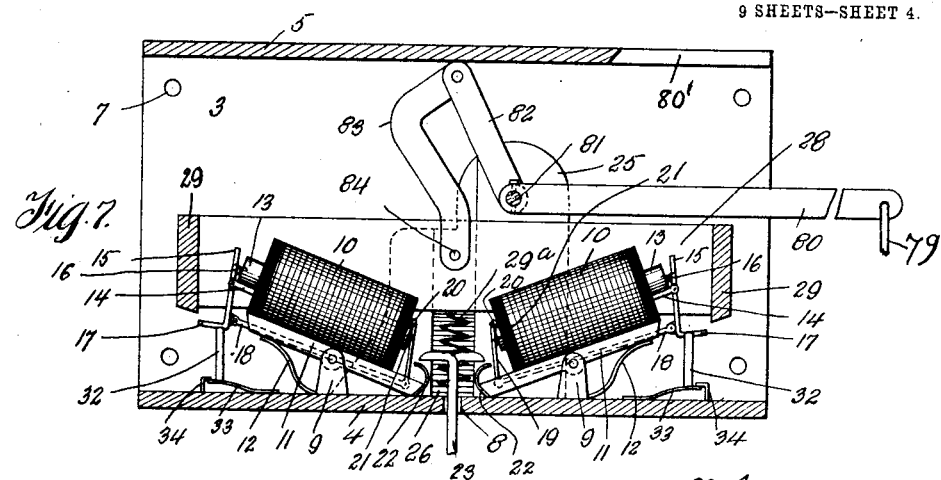
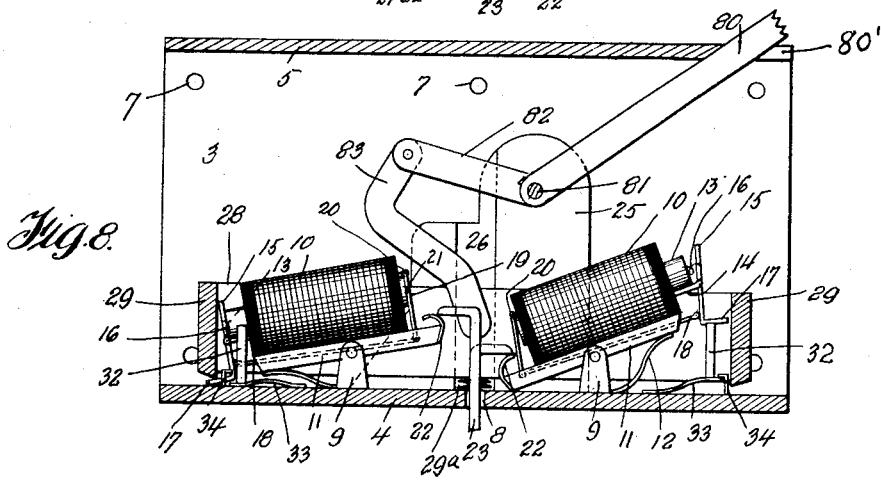
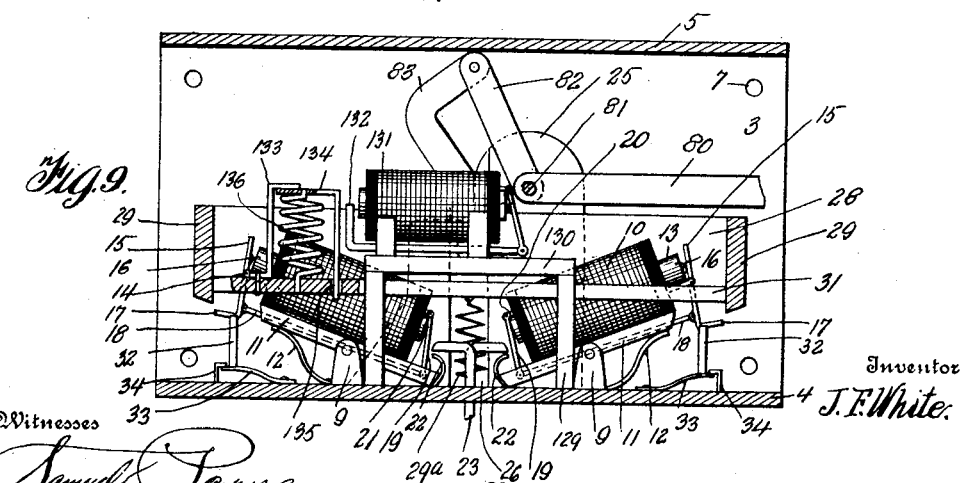

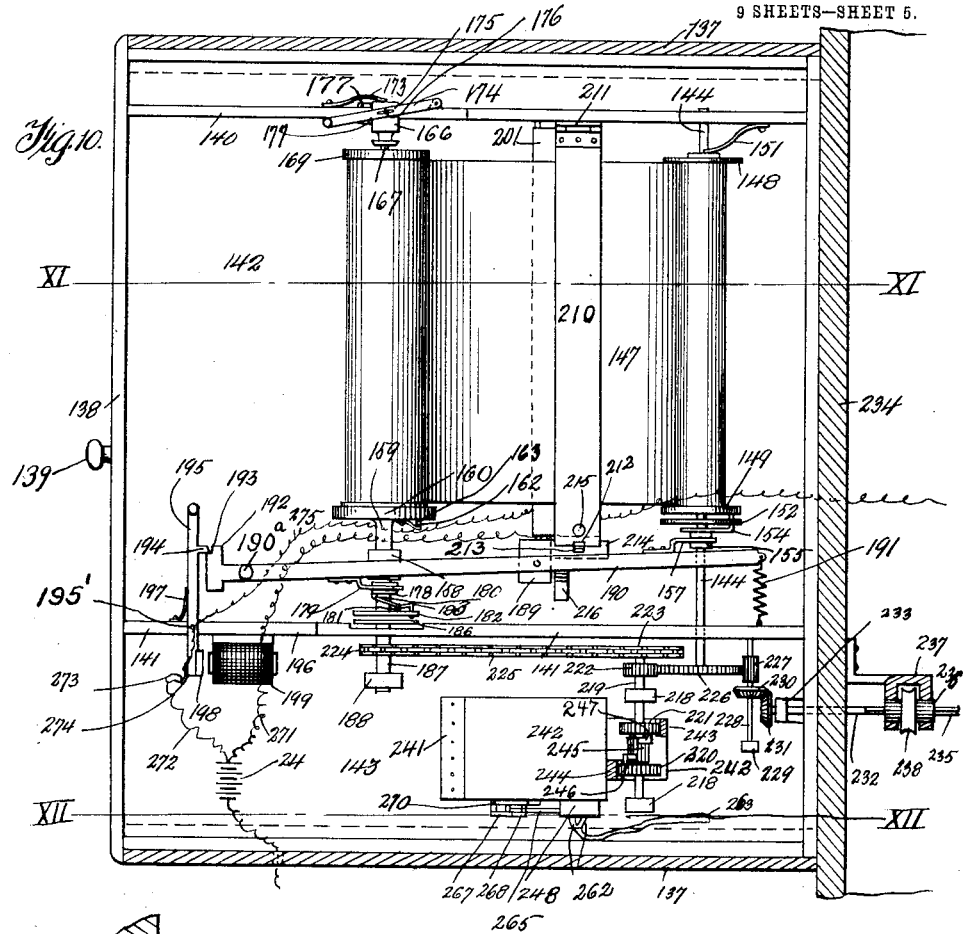
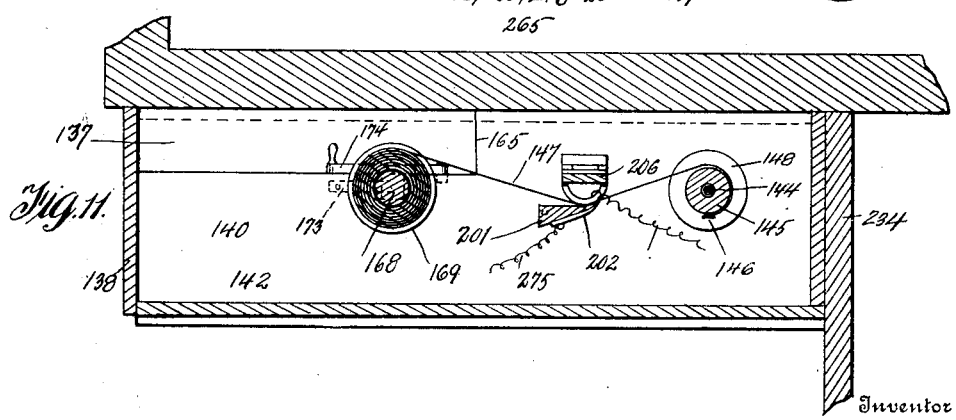

J. F. WHITE.
ELECTROMECHANICAL PLAYER FOR MUSICAL INSTRUMENTS.
APPLICATION FILED NOV. 13, 1908.
1,088,499.
Patented Feb. 24, 1914.
9 SHEETS—SHEET 6.
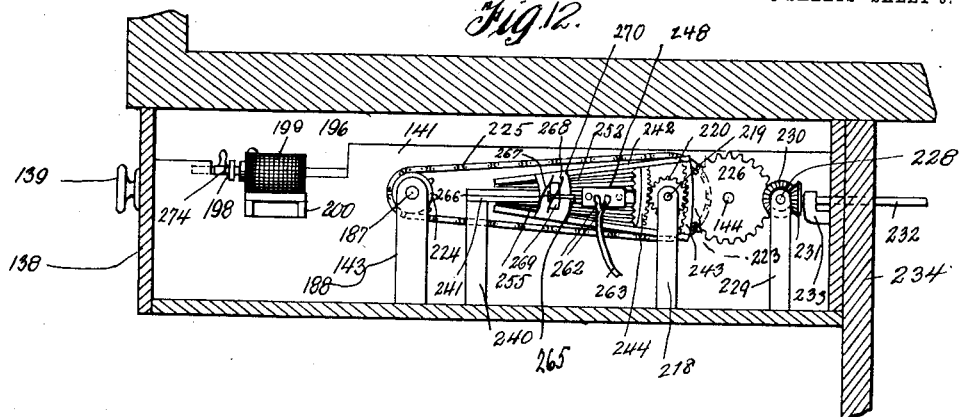
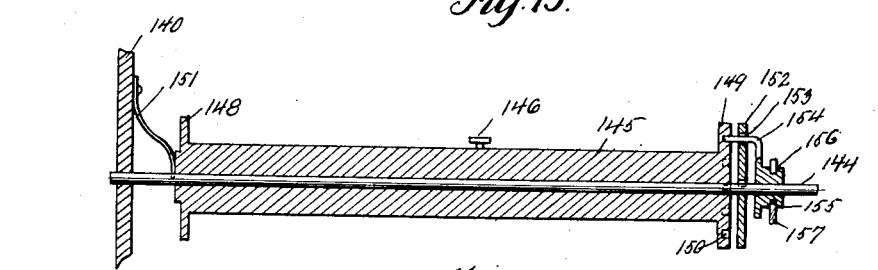
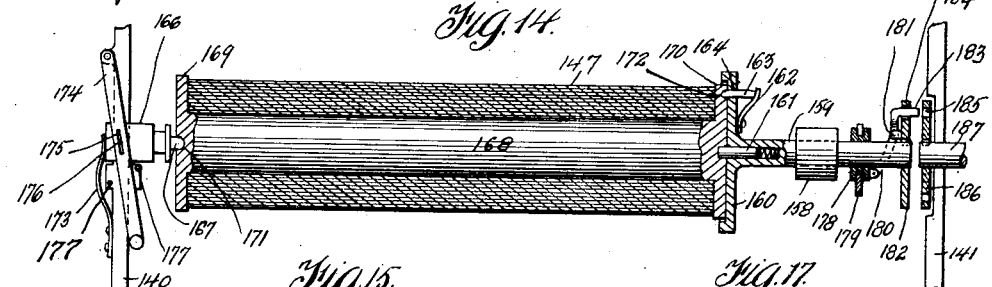
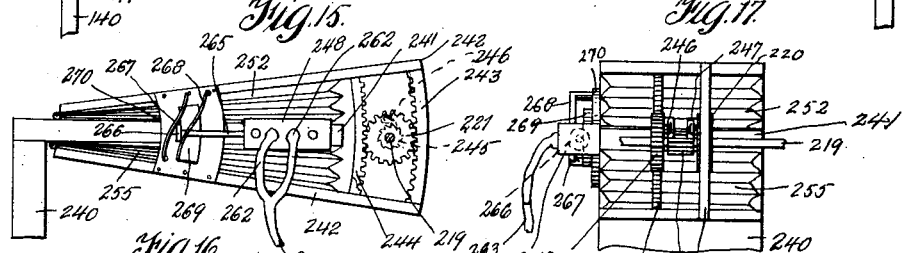
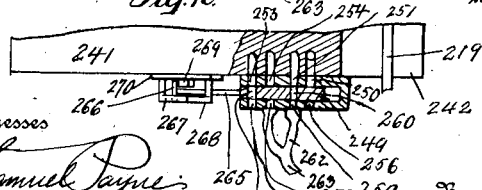
Inventor
J. F. White
Witnesses
Samuel Payne
R. H. Butler
By H. C. Evert & Co.
Attorneys
COLUMBIA PLANOGRAPH CO., WASHINGTON, D. C.

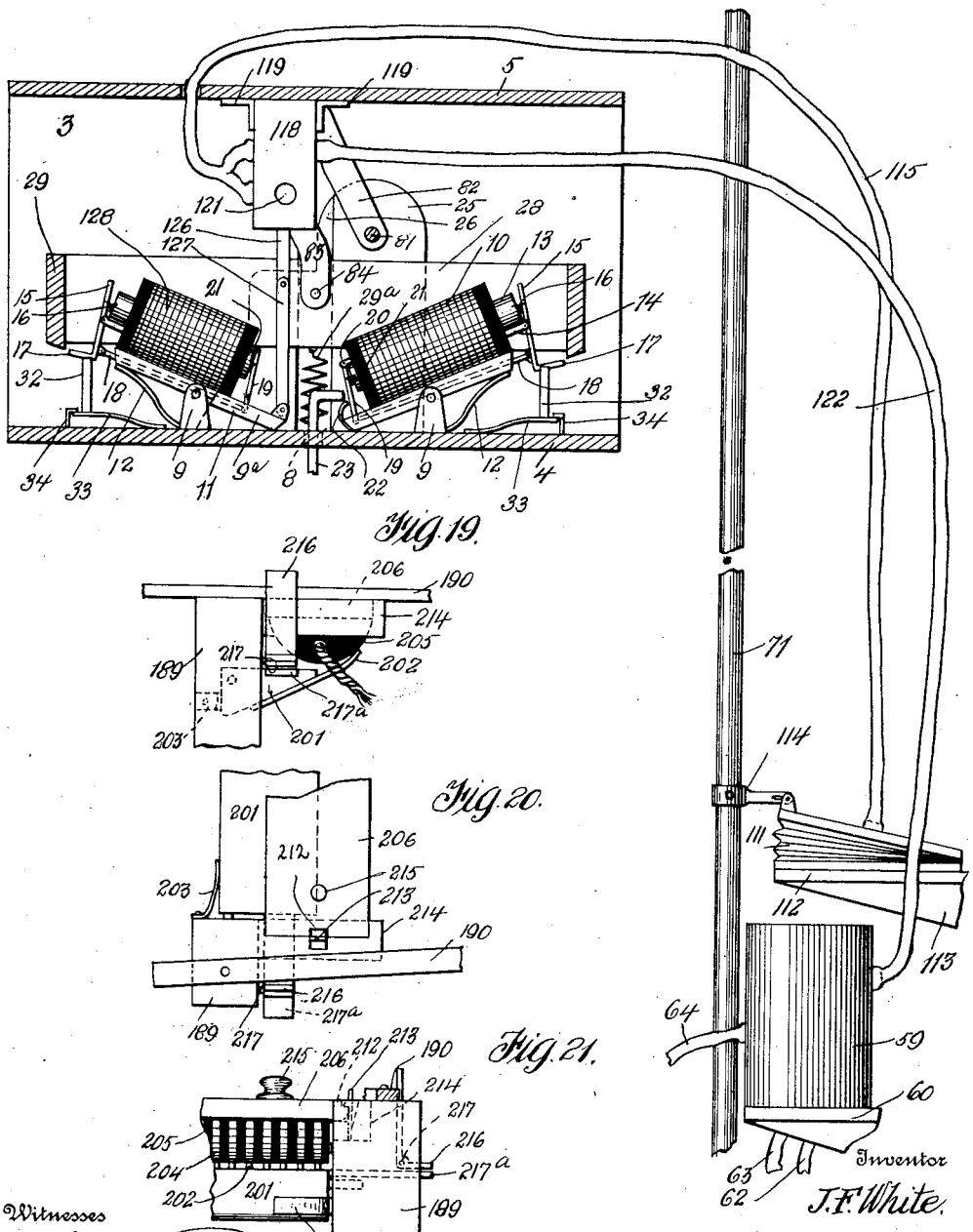

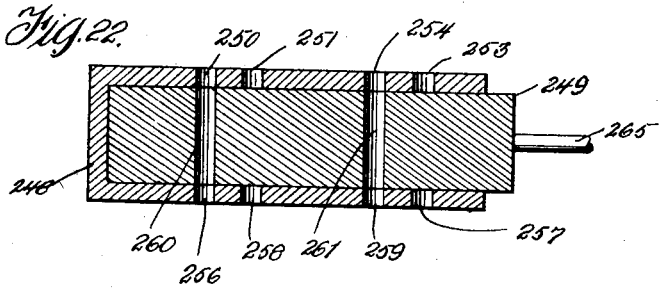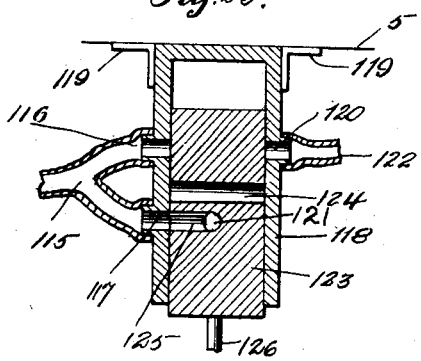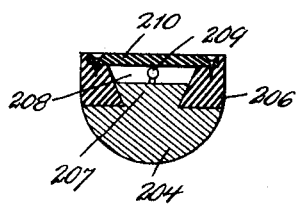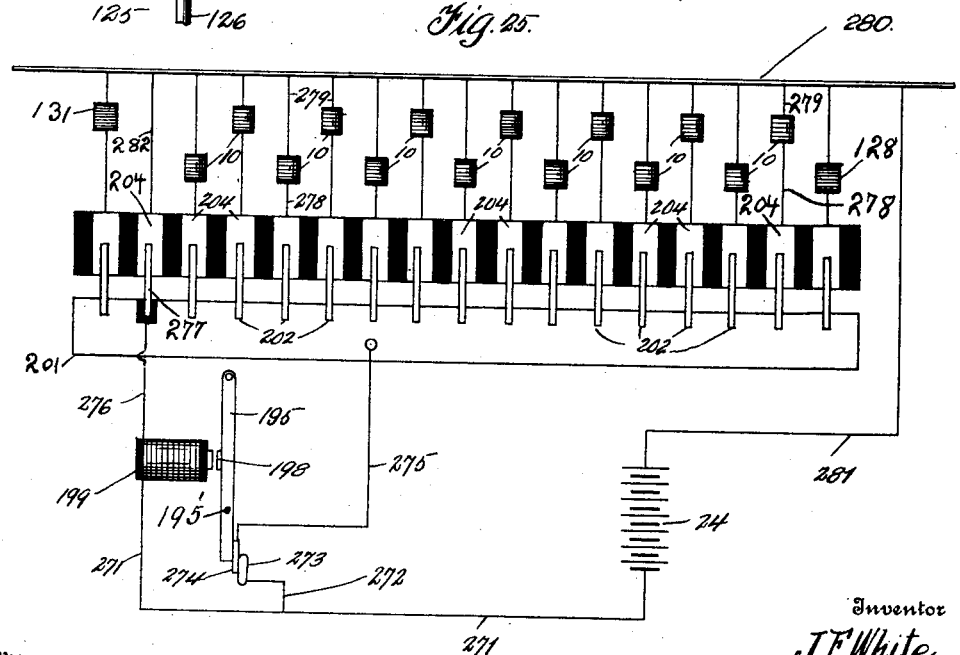

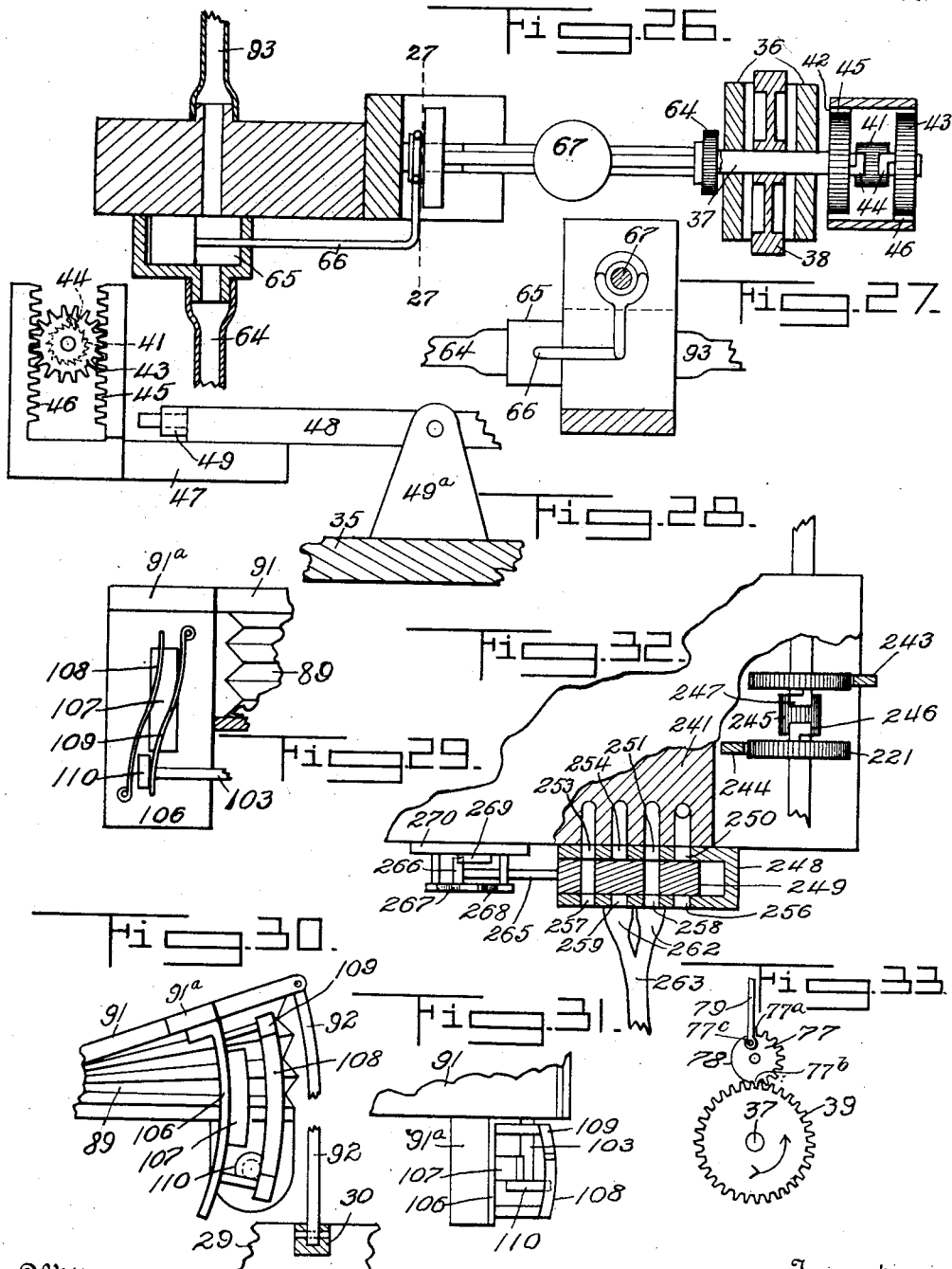

UNITED STATES PATENT OFFICE.

JOHN F. WHITE, OF PITTSBURGH, PENNSYLVANIA.

ELECTROMECHANICAL PLAYER FOR MUSICAL INSTRUMENTS.

1,088,499.    Specification of Letters Patent.    Patented Feb. 24, 1914.

Application filed November 13, 1908. Serial No. 462,446.

*To all whom it may concern:*

Be it known that I, JOHN F. WHITE, a citizen of the United States of America, residing at Pittsburgh, in the county of Allegheny and State of Pennsylvania, have invented certain new and useful Improvements in Electromechanical Players for Musical Instruments, of which the following is a specification, reference being had therein to the accompanying drawing.

This invention relates to an electromechanical player for musical instruments, such as a piano, or similar keyed instrument.

The primary object of my invention is the utilization of electrical and mechanical means for automatically reproducing upon a piano, a piece of music represented by a perforated sheet of paper movably placed in the player for controlling and governing said electromechanical means.

Another object of my invention is to provide an apparatus of novel form and construction which can be applied to and removed from keyed instruments of ordinary construction, such as upright pianos and the like, without alteration of the instrument or its casing in any noticeable manner and which will not detract from the appearance of the instrument to which it is applied or in any manner interfere with or render difficult the task of playing the instrument in the ordinary manner by those possessed of the requisite skill.

In the art of automatic player mechanisms for keyed instruments, numerous pneumatically-operated devices have been perfected in which the mechanism is governed by a traveling sheet of perforated paper, the pneumatic mechanisms being either located in a cumbersome and unsightly exterior attachment for the piano, or crowded and expensively constructed within the piano. In either instance, such a device is somewhat complicated, necessitating the use of delicate pneumatically-operated mechanism, including valves, regulators, controllers and appurtenant parts, which require expert adjustment and care in construction, thereby rendering such expensive mechanisms prohibitive in a medium grade of instrument.

My invention has been devised with the aim of dispensing with the aforesaid expensive and cumbersome devices, and the providing of an automatic player by which the desired expression can be obtained without any manual manipulation by the operator; the services of the operator simply being required for changing the perforated sheet of music and stopping or starting the player mechanism.

The invention has for its further object to provide a piano player with a novel selector drawer, slidably mounted beneath the key-board of the piano, the selector drawer being opened during the exchange of rolls of music and closed during the operation of the player mechanism. In the last named position the drawer is so arranged as to offer no obstruction or obstacle to the playing of the instrument in the ordinary manner, and will, in fact, be substantially concealed by the key-board so as not to detract from the appearance of the piano or instrument.

Reference will now be had to the drawings, wherein:

Figure 1 is a side elevation of an upright piano, partly broken away and partly in section equipped with my improved player mechanism, Fig. 2 is a cross sectional view of a portion of the player illustrating the key actuating devices, Fig. 3 is a front elevation of one of the key actuating devices showing the means employed for temporarily holding same in a tilted position, Fig. 4 is a plan of a portion of the player mechanism, partly broken away, Fig. 5 is an enlarged vertical sectional view of the lower portion of a piano, illustrating the combined pedal and bellows actuating mechanism, Fig. 6 is a plan of the same mechanism, Fig. 7 is an enlarged cross sectional view of a portion of the player mechanism illustrating the key actuating devices in the inactive position, Fig. 8 is a similar view illustrating one of the key actuating devices in a tilted or active position, Fig. 9 is a similar view illustrating part of the expression control mechanism, Fig. 10 is a plan of the selector drawer and the mechanism contained therein, Fig. 11 is a cross sectional view of the same taken on the line XI—XI of Fig. 10, Fig. 12 is a similar view taken on the line XII—XII of Fig. 10, Fig. 13 is a horizontal sectional view of the take-up roll of the selector mechanism, Fig. 14 is a similar view of the music-sheet spool of the selector mechanism, Fig. 15 is a side elevation of a double bellows used in connection with the selector mechanism, Fig. 16 is a horizontal sectional view of a portion of the same, illustrating a slide valve, Fig. 17 is an end view of the double bellows, Fig. 18 is a cross sectional view of a portion of the player mechanism in connection with a bellows and air reservoir, illustrating the damper control mechanism, Fig. 19 is an end view of the tracker bar forming part of the selector mechanism, Fig. 20 is a plan of a portion of the same, Fig. 21 is an elevation of a portion of the tracker bar, Fig. 22 is a longitudinal sectional view of the slide valve of the double bellows of the selector mechanism, Fig. 23 is a vertical sectional view of the slide valve forming part of the damper control mechanism, Fig. 24 is a cross sectional view of the metallic contact bar of the selector mechanism, Fig. 25 is a diagrammatic view of the electrical connections of the player. Fig. 26 is a sectional view of the pedal and lever actuating mechanism taken on the line 26—26 of Fig. 5. Fig. 27 is a cross sectional view of the same mechanism taken on line 27—27 of Fig. 26. Fig. 28 is an enlarged detail side elevation of a portion of the pedal and lever actuating mechanism. Figs. 29, 30, and 31 are enlarged details of portions of bellows mechanism employed for actuating the reciprocatory frame. Fig. 32 is an enlarged detail plan and sectional view of a part of the pneumatic motor mechanism employed in connection with the selector mechanism, and, Fig. 33 is a detail elevation of the gear wheels embodied in the pedal and lever actuating mechanism.

Before describing the construction and operation of the various elements which are employed to actuate the keys or hammers of a piano, it is thought best to describe the general organization to which, in the construction of my player, I prefer to resort:

A, Fig. 1, indicates an upright piano of any preferred form. In this piano directly above the rear ends of the keys and conveniently supported in advance of the hammer-action is a longitudinal casing, in which are assembled the instrumentalities or devices for actuating the keys and thereby the hammer-action; these instrumentalities are operated by suitable actuating devices preferably located within the piano upon the base of the same. Since it is required that all the devices perform their respective offices very rapidly and yet within as small and compact a space as possible, due to limited space in pianos of various types, it is preferable to operate them from actuating contrivances somewhat remote from them, therefore the location of the actuating devices is at the base of the piano.

In connection with the foregoing devices, there is a selector located below the key-board of the piano, and including means for controlling the general operation of the piano. The selector is the only exposed feature of my player and exposure only occurs, as heretofore stated, when a perforated sheet of music is being placed in the player for reproduction.

In the player the following devices for performing particular portions of the work are embodied: 1st: A plurality of tiltably-mounted key-actuators and electro-magnets coöperating therewith. 2nd: A reciprocating frame for operating said actuators. 3rd: Devices for temporarily holding the actuators in tilted position. 4th: A bellows mechanism for reciprocating the frame. 5th: A damper control mechanism. 6th: An expression control mechanism. 7th: A movable selector mechanism. 8th: A pneumatic motor mechanism for operating the selector mechanism. 9th: A pedal and lever mechanism operating with or independently of the bellows mechanism for reciprocating the frame, and also with or independently of the pneumatic motor device that operates the selector mechanism. 10th: A source of electrical energy controlled by the selector mechanism for energizing the electro-magnets, and the circuits therefor.

Of the above stated instrumentalities, the pedal and lever action for operating the reciprocating frame and the selector mechanism may be dispensed with if desired as the same is auxiliary to the main operating devices for these mechanisms and the operation of the player is not dependent upon the employment of the pedal and lever action.

*Tiltably-mounted key-actuators and electromagnets therefor*, (Figs. 2, 3, 4, 7, 8 and 9).—The key actuators are best shown in the figures noted above, and constitute devices that can be operated individually, or in groups for producing single notes or chords as may be indicated by the perforated sheet of music. In the piano A directly above the rear end 1 of the piano keys 2 is arranged an oblong casing, comprising end walls 3, a bottom plate 4 and a top plate 5. This casing can be made of wood or metal with the end walls 3 suitably secured to the sides 6 of the piano, as at 7. The bottom plate 4 of the casing is provided with a central longitudinal slot 8 extending approximately from end to end of said plate, and upon said plate, at each side of the slot, are standards 9 arranged in pairs, with the pairs of standards in the row on one side of the slot staggered with respect to the pairs of standards in the row on the opposite side of said slot. These standards carry the key-actuators which in this instance, are in the form of platforms 11 pivotally mounted in the standards and each having an electro-magnet 10 mounted thereon. Although the magnets are shown as mounted on the platforms so as to tilt with the latter, the platforms constituting supports for the electro-magnets, which construction I prefer, such an arrangement is not essential to secure an operative device, it being necessary only that an electromagnet be provided for each platform or actuator and so arranged as to cooperate therewith. The platforms 11 are normally held in a tilted position (see Fig. 2) with their inner ends resting upon the base plate 4, by means of springs 12 secured at one end to the plate 4 and bearing at the other end against the underneath faces of the platforms near the outer ends of the latter. Each magnet 10 embodies a central longitudinal fixed core 13 and projecting from the outer end of each magnet 10 and beneath and to the sides of the outer end of said core, are arms 14 to which is pivoted an armature 15, said armature being connected to the core above the pivot point of the armature with the arm 14, by a coil spring 16. The lower end of said armature is provided with a right-angular detent 17 and an inwardly projecting pivoted rod 18. The rod 18 extends beneath the platform 11 and has the inner end thereof pivotally connected to an armature 19, pivotally suspended from a bracket 20, carried by the inner end of the electro-magnet 10. This armature 19 is connected by a coil spring 21 to the core 13, and said armature is attracted thereto when the electro-magnet is energized. The inner end of each platform 11 supports a resilient member 22 for engagement with the hook-shaped upper end of a vertically-extending key-actuating rod 23 carried by each piano key 2, and extending upward through the longitudinal slot 8 of the plate 4. All of the electro-magnets 10 are connected by wires (not shown) to a suitable source of electrical energy 24 (see Fig. 10) and to the selector mechanism to be considered under another caption.

In the herein illustrated embodiment of the invention, the key-actuating rods 23 are, as stated, connected to the keys of the piano, and it will be evident that when the rods 23 are raised by their actuators, the rear end of the keys will be elevated so as to engage and operate the hammer-actions (not shown) to cause the hammers to strike the strings of the piano. In operating the player therefore, the keys of the piano are also operated in the embodiment of the invention shown, but I do not wish to limit myself to the employment of a device connected with the keys in the manner shown, as it will be obvious that this connection is for the purpose only of thereby operating the hammer action, and I may operate the latter direct so that the keys of the piano remain inactive during the operation of the player.

*Reciprocating frame for tilting the key actuators*, (Figs. 2, 7, 8, 9 and 18.)—Located upon the bottom plate 4 of the oblong casing contiguous to the ends thereof, are standards 25, (see figures noted above, and Fig. 4) the confronting sides of said standards having vertical grooves 26 formed therein for slide blocks 27. These slide blocks 27 are carried by the end bars 28 of a reciprocating frame comprising in addition to said end bars longitudinal or side bars 29 adapted to engage the detent 17 and tilt the key-actuators to elevate the rods 23 and operate the keys 2 connected thereto. As the bars 29 and the detents 17 are subjected to considerable wear, said bars and detents are preferably made of metal and case-hardened. The bars 29 are connected intermediate the ends thereof by a plurality of transverse braces 30 and 31, serving to strengthen the frame, and also serving as supports for elements of construction to be hereinafter considered. The reciprocating frame is normally supported in an elevated position—out of engagement with the detents 17—by means of two coiled springs 29ª arranged between the end bars 28 of the reciprocating frame and the plate 4.

*Devices for temporarily holding the key-actuators in a fixed position*, (Figs. 2, 7, 8, 9 and 18.)—To accomplish the holding down of a key as is necessary when a full, half or quarter note is to be reproduced by the player, I have devised means for temporarily holding the key-actuator 11 in an active position, as best shown in Fig. 8. The device used for this purpose is located at the outer end of each electro-magnet, and comprises a bifurcated soft iron peg 32, carried by a resilient strip of metal or spring 33 secured to the bottom plate 4, said spring or strip of metal being limited in its vertical movement by the plate 4 and a stop 34 carried thereby. When a key-actuator is tilted to an active position by one of the bars 29 striking the detent 17 of the armature, the detent passes into the bifurcation of the peg 32 and said peg is attracted by the outer end of the core 13 of said magnet and holds the key actuator during the energization of the magnet. The spring or strip 33 simply serves to cushion the contact of the core 13 with the peg 32, carried by said spring or strip.

*Pedal and lever action for reciprocating the frame and operating the key actuating devices*, (Figs. 5, 6, 26, 27 and 28.)—Upon the base board 35 of the piano case is mounted a two-armed standard 36 in which is mounted a shaft 37; on the shaft 37 between the arms of said standard is a balance wheel 38. The shaft also has mounted thereon adjacent to the standard a gear wheel 39; on the forward end of the shaft is a belt wheel or pulley 40 and at its rear end the shaft carries a ratchet wheel 41 and loose pinions 42, 43, the latter placed one on each side of the ratchet wheel 41. These pinions each carry a pivoted spring-pressed or gravity pawl 44 for engaging the ratchet wheel 41. The pinions 42, 43 are engaged and operated to turn the shaft 37 by vertical racks 45, 46 respectively connected at their base and from which base projects an extension 47 that is connected to a lever 48 near one end of the latter, said lever pivoted in a standard 49ª mounted on the base board 35. The respective ends of the lever 48 project into eyes provided therefor in the forward ends of bars 49, 50 which are pivoted in standards 51 carried by the base board 35. (Figs. 5 and 6.) Depending from the forward ends of the bars 49, 50 (see Fig. 5) are rods 52 connecting with the rear ends of pedals 53 and 54 (Fig. 6) which pedals are pivotally mounted in supports 55 carried by the base board 35. The pedals 53, 54 extend forwardly beyond the front board of the piano case and are provided with the usual tread pieces 56. The rear ends of the bars 49 and 50 are pivotally connected to feeders 57 and 58 secured to the base-board 35. Located adjacent to one of said feeders is a reservoir 59, which is supported by a bracket 60, carried by the back-board 61 of the piano case. This reservoir 59 is connected by a tube 62 to the feeder 58, by a tube 63 to the feeder 57, and by a tube 64 to a controlling valve 65, said valve being of the slide valve type having an actuating rod 66. This rod 66 is operated by a governor mechanism 67 of usual form located between a standard 68 mounted on the base-board 35 and the double-armed standard 36. The governor mechanism 67 is operated by a pinion 69 on the shaft of the governor mechanism meshing with the gear wheel 39. By this connection with the pedal action I control the storage of air in the reservoir 59 since, should the shaft 37 be operated too rapidly, the governor will act to partially close the valve and prevent more than the required quantity of air entering the reservoir 59. Connected to the forward ends of the bars 49 and 50 and to the base-board 35, are retractile springs 70, normally holding the rear ends of the bars elevated and the feeders 57 and 58 in an expanded condition.

Operating with the pedals 53 and 54 are other pedals common to a piano for producing, when depressed, certain effects desired in the rendition of a musical composition, one in particular being a pedal 76 for actuating the damper rod 71, Figs. 5 and 18. The lower end of the rod 71 is pivotally connected, as at 72, to the rear end of a bar 73 pivoted in a standard 74, carried by the base-board 35. The forward end of the beam 73 is connected by a rod 75 to the pedal 76. The damper rod 71 will be hereinafter referred to in connection with the damper control mechanism. Movably supported by the double-armed standard 36 is a small gear wheel 77, said wheel being stripped of some of the teeth thereof, as at 78, for a purpose that will appear in the general operation of the player. The gear wheel 77 meshes with the gear wheel 39, and is eccentrically connected to a rod 79, which extends upwardly through the lower portion of the piano case and is pivotally connected to an arm 80 fixed upon a shaft 81 journaled in the standards 25. The arm 80 is permitted to have considerable range of movement when operated by providing a slot 80' in the cover 5 of the oblong casing; the shaft 81 is provided at each end thereof with two cranks 82 and pivotally connected to said cranks are irregularly curved links 83, said links connecting with the end boards 25 of the reciprocating frame, as at 84. (See Fig. 7).

*Bellows action coöperating with the pedal and lever action for actuating the reciprocating frame,* (Fig. 2.)—The bottom board 4 is provided intermediate the ends thereof with two bridges 85 having depressions 86 providing clearance for the longitudinal shaft 81. (See Fig. 2.) These bridges carry a platform 87 and upon said platform is mounted a valve cylinder 88 and a superposed bellows 89, comprising a foundation board 90 and a top board 91, which is connected to the foundation board 90 by the well known collapsible casing. The top board 91 is connected by a depending side arm 92 (see Fig. 30) to the transverse brace 30 of the reciprocating frame, and by a duct or flexible tube 93 to the controller valve 65.

The valve cylinder 88 is employed for controlling the exhaust of air from the bellows 89, and in connection with said cylinder a novel controlling device or valve is used. The cylinder 88 is subdivided into three compartments 94, 95 and 96, with a space 97 between compartments 94 and 95. The compartments 94 and 95 communicate with the interior of the bellows 89 by ports 98 and 99 respectively formed in the top of the cylinder 88 and in the foundation board 90. Compartment 96 communicates with compartment 95 by a port 100, and with the atmosphere by a port 101 formed in the end of the cylinder. Compartment 94 communicates with the space 97 and atmosphere by a port 102. Arranged longitudinally of the cylinder 88 and extending into the compartments 94, 95 and 96 is a rod 103 having a valve 104 within compartment 94 and a similar valve 105 in the compartment 96. The valves 104 and 105 are adapted to alternatingly close the ports 100 and 102 and control the movement of the bellows 89. The movement of the rod 103 is controlled by a device carried by an extension 91ª of the top board 91 of the bellows 89. (See Figs. 2, 29, 30, 31). This device comprises a depending plate 106 upon which is arranged a block 107, and two compound curved springs 108 and 109, said springs being approximately parallel and in advance of said block. The springs 108 and 109 are adapted to engage a head 110, carried by the outer end of the rod 103. The spring 108 is of a tension greater than the pressure of air from the chamber of the controlling valve 65 (see Figs. 1, 2 and 26), whereby the rod 103 can be shifted by a downward movement of the bellows board 91, as will hereinafter appear.

*Damper control mechanism,* (Figs. 18, 23.)—For producing a loud and full sounding effect, I employ mechanism in connection with the damper rod 71 of the piano for automatically raising the rod. This mechanism consists of a bellows 111, the foundation board 112 of which is mounted on a bracket 113 secured to the back-board 61 of the piano case. The top board of the bellows is pivotally connected to an arm 114 fixed upon the rod 71, and by a duct or flexible tube 115 to the ports 116 and 117 of a controller valve body 118, suspended between brackets 119 carried by the top plate 5 of the oblong casing. The valve body 118 is provided with an inlet port 120 and an exhaust port 121, said inlet port being opposite the port 116 and connecting with the reservoir 59 by a duct or flexible tube 122. Slidably mounted in the valve body 118 is a valve 123 having a passage 124 adapted to be brought into registry with the ports 116 and 120, and also having a passage 125 for establishing communication between the ports 117 and 121, when said valve is shifted to close ports 116 and 120. To shift the valve 123, it is provided with a depending stem 126, which is connected by a pivoted link 127 to the platform 9ª of an electro-magnet 128, constructed similar to the magnets 10, and arranged at one end of one of the rows of electro-magnets 10, and actuated by the reciprocating frame when the magnet is energized.

*Expression control mechanism,* (Figs. 4, 9, 25.)—The bottom plate 4 is provided with standards 129 arranged in pairs on opposite sides of the slot 4, one standard of each pair being on one side of the brace 31, and the other standard of each pair on the opposite side of said brace, these standards supporting platforms 130. There are two of these platforms, one near each end of the oblong casing and each platform supports an electro-magnet 131 similar to the electro-magnets 10, the electro-magnets 131 having armature-bars 132 actuated by the energizing of said electro-magnets. Secured to each one of the braces 31 directly in front of each one of the electro-magnets 131 is a bracket 133, and engaging said bracket is an inverted L-shaped bar 134, said bar extending through an opening 135 formed in the brace 31. Interposed between the bar 134 and the brace 31 is a spring 136 normally holding the bar 134 in engagement with the bracket 133 and being of relatively less strength than the spring 29ª.

When the reciprocating frame is lowered and the electro-magnets 131 are energized, the armature-bar 132 is moved into the path of the bar 134 and upon an upward movement of the reciprocating frame, the bar 134 engages beneath the armature-bar 132. With the bar 134 held by the armature-bar 132 the spring 136 will be under considerable stress upon each downward stroke of the reciprocating frame. The expansion of said spring will give the reciprocating frame considerable impetus, causing said frame to tilt the electro-magnets 10 with considerable force, and through the medium of the rods 23, cause the hammers of the piano to strike the strings thereof with considerable force. Immediately upon the electro-magnet 131 being deënergized, the bars 134 assume their normal position shown in Fig. 9 of the drawings.

*Movable selector mechanism,* (Figs. 10 to 14.)—Beneath the key bed of the piano are arranged cleats 137 for supporting a drawer 138 having a suitable knob 139 to permit of the drawer being drawn out. In the drawer 138 are arranged two transverse partitions 140 and 141, these partitions providing a compartment 142 in which the music-sheet spool and the take-up roll together with certain parts of the mechanism are located, the partition 141 and one end wall of the drawer forming a compartment 143 in which the driving mechanism for the spool and roll is located. Journaled in the partitions 140 and 141 and extending into the compartment 143 is a longitudinal shaft 144. Loosely mounted upon this shaft within the compartment 143 is a take-up roll 145 having a button 146 to which a perforated sheet of paper 147 can be attached. The take-up roll 145 is provided with heads 148 and 149, the latter having circumferentially arranged notches 150 in its outer face, while the former is engaged by a flat spring 151 secured to the partition 140. Keyed upon the shaft 144 adjacent to the head 149 is a disk 152, having an opening 153 formed therein through which protrudes a clutch pin 154 adapted to engage in one of the notches 150 of the head 149, said pin being carried by a spool 155 loosely mounted upon the shaft 144. The spool 155 is provided with a peripheral groove 156 for a bifurcated arm 157 employed for shifting said spool relative to the disk 152. With the spool 155 in the position shown in Fig. 13 of the drawings, with the pin 154 engaging the head 149, the spring 151 holds said pin in engagement with the head 149. The spring 151 also has another function namely for preventing the roll 145 from revolving too freely on the shaft 144.

In the selector compartment 142 is located a post 158 for a shaft 159, said shaft having a flanged head 160 with a central spring-pressed pin 161. Secured to the outer side of the head 160 is a spring arm 162 having a pin 163 adapted to extend through an opening 164 formed in the flanged head 160. In the line of the shaft 159 extended, the partition 140 is cut away, to receive a movable block 166 which block carries a pivot pin 167. This pivot pin is employed for supporting one end of a music-sheet spool 168, the opposite end of said spool being supported in the flanged head 160. The music-sheet spool is provided with heads 169 and 170, the former being provided with a central socket 171 for the pivot pin 167, while the latter is provided with a notch 172 for the spring-pressed pin 163. Secured to the partition 140 is a flat spring 173 having its free end engaging the outer end of the block 166 for holding the pivot pin 167 in engagement with the head 169. Pivotally mounted upon the partition 140 adjacent to the block 166 is a throw off lever 174, said lever being slotted, as at 175, to receive a pin 176, carried by the block 166. The lever 174 is limited in its movement by upwardly projecting pins 177 carried by the partition 140. The spool 168 supports the perforated sheet of paper 147, and the paper is wound onto the take-up roll 145 from the spool 168 and is then again wound onto the spool 168 from the take-up roll 145, as will hereinafter appear.

Loosely mounted upon the shaft 159 is a sleeve 178, and engaging said sleeve is a bifurcated arm 179 employed for shifting the sleeve upon the shaft 159. Pivotally connected to the sleeve 178 is an angular lever 180, said lever being fulcrumed, as at 181 upon a disk 182 keyed upon the shaft 159. The lever 180 is provided with an extension 183 protruding through an opening 184 formed in the disk 182. The extension 183 is adapted to engage in one of the openings 185 of a disk 186 mounted upon a shaft 187, journaled in the partition 141 and a post 188 provided therefor in the compartment 143.

In the compartment 142 adjacent to the partition 141 is a post 189 and pivotally mounted upon this post is a lever 190, to which the bifurcated arms 157 and 179 are secured. This lever is provided adjacent its outer or forward end with a knob 190ª for convenience in shifting the lever. The inner end of the lever 190 is connected by a spring 191 to the partition 141, while the opposite end is provided with a cross head 192 having a notch 193 adapted to be engaged by a lug 194, carried by an arm 195 pivotally mounted as at 195′ to the partition 141 in the cut-away portion 196 of the latter. The lug 194 is normally held in the notch 193 in the cross head 192 by a flat spring 197 secured to the partition 141 adjacent to the arm 195 and having its free portion bearing against said arm. The arm 195 projects into the compartment 143 and carries the armature 198 of an electro-magnet 199 supported on a bracket 200, carried by the partition 141.

Trunnioned in the post 189 and the partition 140 is a metallic transverse bar 201 carrying a plurality of metal contact fingers 202. The bar 201 is substantially triangular in cross section and the rear edge of said bar is engaged by a spring 203 secured to the post 189, and normally holding the bar 201 in a horizontal position with the contact fingers 202 thereof in engagement with metallic contacts 204, which together with insulation blocks 205 are alternately arranged in a bar 206 preferably constructed of insulation, as porcelain. The contacts 204 and insulation blocks 205 are dove-tailed, as at 207, to slide into the dove-tail groove 208 of the bar 206. The metallic contacts are provided with binding posts 209, and in order that easy access can be had to said binding posts to connect wires thereto, the bar 206 is provided with a detachable cover plate 210. This bar is hinged at one end, as at 211, to the partition 140 and the opposite end of the bar is provided with a notched lug 212 to engage with a resilient clasp 213 mounted in an extension 214 of the post 189. After the clasp 213 is moved out of engagement with the lug 212, the elevation of the bar 210 is facilitated by a knob 215 carried by the bar 206 adjacent to the lug 212. The metallic contact fingers 202 are swung out of engagement with the metallic contacts 204 by a bell crank lever 216 pivotally connected to the post 189, as at 217. The bell crank lever 216 is engaged by the lever 190 and said bell crank lever 216 engages an extension 217ª of the bar 201.

*Pneumatic motor mechanism coöperating with the pedal and lever action for operating the selector mechanism,* (Figs. 10, 12, 15, 16, 17.)—In the compartment 143 are located standards 218 for a shaft 219. Upon this shaft are loosely mounted pinions 220 and 221, a fixed gear wheel 222 and a fixed sprocket wheel 223. On the shaft 187 protruding into the compartment 143 and alined with the music-sheet spool 168 is located a sprocket wheel 224 and upon this sprocket wheel and the sprocket wheel 223 is mounted a sprocket chain 225. One end of the shaft 144 of the take-up roll extends into the compartment 143 and is provided with a large gear wheel 226 meshing with the small gear wheel 222 of the shaft 219, and with another small gear wheel or pinion 227, mounted upon a shaft 228, journaled in the partition 141 and a standard 229 arranged within the compartment 143. The shaft 228 is provided with a beveled gear 230 meshing with a beveled gear 231 carried by the inner end of a shaft 232, said shaft being journaled in a bracket 233 arranged within the compartment 143. The shaft 232 extends rearwardly through the drawer 138 and through the front board 234 of the piano case. The rear end of the shaft 232 is formed with a rectangular portion 235 and slidably mounted upon this rectangular portion is a sleeve 236, journaled in a bifurcated bracket 237 carried by the front piano board 234. The sleeve 236 is adapted to revolve with the shaft 232 and is provided with a pulley wheel 238. Upon this pulley wheel and the belt wheel 40 is mounted an endless cable or belt 239. It will be remembered that the belt wheel 40 forms part of the pedal action in the base of the piano case, and it is through the medium of this action that I am enabled to revolve the shafts 144 and 187 by the mechanism just described. The drawer 138 can be pulled outwardly without disengaging the shaft 232 from the sleeve 236, motion being imparted to the shaft 232 from the sleeve 236 irrespective of whether the drawer is closed or open. To permit of this outward movement of the drawer without disengagement between gears 230, 231, the rectangular portion 235 of the shaft is extended considerably beyond the sleeve 236 and has free sliding movement therein as will be apparent.

Located adjacent to the shaft 219 and supported by a bracket 240 within the compartment 143 is a pneumatic motor embodying a bellows comprising a foundation board 241 and outer boards 242, these outer boards extending beyond one end of the foundation board and being connected by segment racks 243 and 244 meshing with the pinions 220 and 221 respectively of the shaft 219. Upon the shaft 219 between the pinions 220 and 221 is mounted a ratchet wheel 245 engaged by pivoted gravity pawls 246 and 247 carried by the loosely mounted pinions 221 and 220 respectively. The racks 243, 244, pinions 220 and 221, ratchet wheel 245 and pawls 246 and 247 are similar to the racks 45 and 46, pinions 42 and 43, ratchet wheel 41, and pawls 44, previously described in connection with the pedal and lever mechanism for reciprocating the frame and operating the key actuating devices.

Located upon one side of the foundation board 241 is a valve casing 248 and slidably mounted in said valve casing is a valve 249. (Figs. 15, 16, 17 and 32.) The valve casing 248 is provided upon one side with an inlet port 251 and an exhaust port 250 communicating with the upper bellows 252, and is also provided with an inlet port 254, and an exhaust port 253, communicating with the lower bellows 255. The outer side of the casing 248 is provided with inlet ports 258 and 259 alining with the inlet ports 251 and 254 upon the opposite side of the casing, and is further provided with exhaust ports 256 and 257 alining with the exhaust ports 253 and 250 in the opposite side of the casing. The valve 249 is provided with passages 260 and 261, the passage 260 being adapted to establish communication between the ports 250 and 256 simultaneously with the passage 261 establishing communication between the ports 254 and 259. In consequence of this arrangement of ports and passages, the upper bellows 252 can exhaust when the lower bellows 255 is taking air, and vice versa.

The inlet ports 258 and 259 are connected (see Figs. 12-15, 16 and 17) by branch tubes 262 to a tube or duct 263 extending rearwardly through the drawer and the front piano board 234 and connecting with the tube or duct 93, which connects the controlling valve 65 with the bellows 89 employed in connection with the mechanism for actuating the reciprocating frame.

The valve 249 (Figs. 16 and 32) is provided with a stem 265 having a head 266. The head 266 on its outer end is engaged by two compound curved springs 267 and 268 and by a block 269, carried by a plate 270 mounted upon the boards 242. These springs, block and plate are similar in construction and perform the same function as the controlling device described in connection with the mechanism for actuating the reciprocating frame and shown in Fig. 2 of the drawings.

*Selector mechanism for energizing the electro-magnets, and the circuits therefor,* (Figs. 10, 11, 12, 25.)—The source of electrical energy heretofore mentioned and designated 24 is preferably in the form of dry cell batteries located within the piano case or in the vicinity thereof, although it is to be understood that an ordinary electric light current of 110 voltage can be used, by installing the proper resistance. The source of electrical energy 24, illustrated in Fig. 25 of the drawings, to be hereinafter termed a battery, is connected by a wire 271 to the electro-magnet 199 of the tracker mechanism and by a wire 272 to a contact 273 located in the compartment 143. This contact 273 is adapted to be engaged by a contact 274 carried by the armature end of the arm 195. Another wire 275 connects the contact 274 with the metal finger bar 201. The electro-magnet 199 is connected by a wire 276 to one of the metallic fingers of the bar 201, which for clearness of illustration in connection with Fig. 25 of the drawings, I designate 277 and which finger is insulated from the bar 201 as clearly shown in Fig. 25. The metallic contacts 204 are connected by wires 278 to the electro-magnets 10, and said electro-magnets are connected by wires 279 to a bus bar 280. This bus bar 280 is connected by a wire 281 to the battery 24.

The metallic contact 204 with which the finger 277 contacts is connected by a wire 282 to the bus bar 280. When the player mechanism is in operation, as will be fully described hereinafter, the circuit is from the battery 24 through wires 271 and 272 to the contact 273, through contact 274 and wire 275 to the bar 201, through the fingers 202 and contacts to wires 278 to the electro-magnets 10, through wires 279 to the bus bar 280 and through wire 281 to the battery 24.

The stopping of the player mechanism is accomplished by the completion of a circuit through the finger 277. The circuit through this finger is as follows: from battery 24 through wire 271 to the electro-magnet 199, through wire 276 to the insulated finger 277 to contact 204, through wire 282 to the bus bar 280, and through wire 281 to the battery 24. When the electro-magnet 199 is energized, the armature 198 is attracted, moving the arm 195 and breaking the connection between contacts 273 and 274. The circuits are then broken through the electro-magnets 10.

*General operation.*—To place the player mechanism in operation, the drawer 138 is withdrawn, and the music-sheet spool placed in position. To place the music-sheet spool in position, lever 174 is moved by hand to permit of the head 170 of the spool being placed in the flange head 160, the socket 171 is alined with the pin 167 and the lever 174 is allowed to return to normal position whereby said pivot pin will engage the said socket. The bar 206 is then swung to an open position and the end of the perforated sheet of paper secured to the button 146 of the take-up roll. The bar 206 is then returned to its normal position and locked by the resilient clasp 213. By reference to Fig. 25, it will be observed that an electrical circuit is normally maintained through the contacts 273 and 274, whereby when a perforation in the sheet of paper 147 allows one of the fingers 202 to engage with one of the contacts 204, an electrical circuit will be established that will energize one of the electro-magnets 10. Consequently, the player is in condition to be operated after the roll of perforated paper 147 has been properly placed in the selector compartment. Assuming now that the pedals 53 and 54 are actuated by an operator's feet engaging the tread-pieces 56, the bars 49 and 50 will be rocked to operate the feeders 57 and 58 and air will be pumped into the reservoir 59 and from this reservoir will pass to the controlling valve 65. Simultaneous with reciprocation of the bars 49 and 50, the racks 45 and 46 will be vertically reciprocated to impart a rotary movement to the shaft 37. This is accomplished through the medium of the loosely mounted pinions 42 and 43 and the fixed ratchet wheel 41. When the racks 45 and 46 are reciprocated, the pivoted gravity pawls 43 engaging the ratchet wheel 41 cause the shaft 37 to continuously rotate, one of the pivoted pawls coöperating with one rack and the other pivoted pawl with the other rack, due to the pinions 42 and 43 being rotated in opposite directions by the racks 45 and 46 respectively. When the shaft 37 is rotated, the governor mechanism 67 is actuated through the medium of the large gear wheel 39 engaging pinion 69 and said mechanism operates the controlling valve 65 through the medium of the actuating rod 66, the governor 67 regulating and steadying the operation. This controlling valve 65 admits air to the tube or duct 93 from whence the air passes to the bellows 89 and to the bellows of the pneumatic motor mechanism located in the operating compartment 143 of the selector drawer 138. The air used for operating the pneumatic motor of the selector mechanism first passes into the valve casing 248 and is admitted to the bellows 252 through ports 258, 260 and 251, causing the bellows 252 to expand, while the bellows 255 contracts and exhausts air through the ports 254, 261 and 259. The expanding movement of the bellows 252 causes the racks 244 and 243 to move upwardly and the rack 244 through the medium of the pinion 221 and pawl 246, imparts a rotary movement to the ratchet wheel 245 mounted upon the shaft 219. The rotation of the shaft 219 imparts a rotary movement to the shafts 144 and 187 through the medium of the pinion 222 and gear-wheel 226, sprocket wheels 223 and 224 and sprocket chain 225. With the lever 190 in the position shown in Fig. 10 of the drawings, the pin 154 protruding through the disk 152 into the head 149 of the take-up roll the spool 155, disk 152 and roll 145 rotate in unison upon the shaft 144, consequently the sheet of perforated paper will be moved between the contact fingers 202 of the bar 201 and the bar 206 and will be wound upon the take-up roll 145.

Before describing the result of the sheet of paper being placed in motion, reference will again be had to the bellows 252, 255 located in the selector drawer. An expansion of the bellows 252 and the retraction of the bellows 255 elevates the plate 270, this plate carrying the block 269. The tension of the spring 267 normally holds the head 266 of the rod 265 in engagement with the block 269, until said block is moved out of engagement with the head 265. The spring 267 then forces the rod 265 inwardly shifting the valve 249, whereby air from the controlling valve 65 will be admitted through ports 259, 261 and 254 to the bellows 255, expanding said bellows, while the bellows 252 exhausts through ports 250, 260 and 256.

The air admitted to bellows 255 expands said bellows and causes the racks 243 and 244 to travel downwardly over the pinions 220 and 221. The rack 243, pinion 220 and pawl 247 now come into play for moving the ratchet wheel 245 in the same direction, as previously set in motion by the rack 244, pinion 221 and pawl 246. The head 266 of the rod 265 is now at the forward side of the block 269, and immediately upon the bellows 255 expanding, said block is moved downwardly in front of said head, with the spring 268 under tension. After the bellows 255 has expanded its requisite distance, the head 266 is released at the upper end of the block 269 and the spring 268 shifts the head to the rear side of the block and consequently moves the rod 265, whereby air will be again admitted to the bellows 252 to expand the same. It will thus be observed that the springs 267 and 268 serve to shift the rod 265 and that the movement of said rod is controlled by the block 269 movable with the bellows 252 and 255. This small device constitutes an automatic valve controlling mechanism which insures a correct utilization of air for operating the bellows 252 and 255 and imparting a continuous rotary movement to the shaft 219, so long as air is supplied by the controlling valve 65 to the valve casing 248.

The passage of air into the bellows 89 is controlled through the medium of the valve cylinder 88, rod 103 and the valve disks 104 and 105. The automatic controlling device comprising the plate 106, block 107, and springs 108 and 109, actuated by the expansion and retraction of the bellows 89, is similar to the device previously described in connection with the bellows 252 and 255 of the selector mechanism. The device in this instance controls the movement of the rod 103 and the admission and exhaust of air to and from the bellows 89, and it is apparent that through the medium of the side arms 92 the frame will be reciprocated in the oblong casing of the player. Assuming that the sheet of perforated paper is in motion, the perforations therein will allow certain fingers 202 to contact with the metallic contacts 204, and by reference to Fig. 25 of the drawings, it will be observed that when the contact is made between the fingers 202 and the contacts 204 that certain circuits are established through the electro-magnets 10. When the electro-magnets 10 are energized, the detents 17 are immediately shifted into the path of the reciprocating frame and the bars 29 of said frame engage said detents and tilt the platforms 11, whereby the resilient members 22 of the platforms 11 will engage the hook-shaped vertical rods 23 and actuate the keys of the piano. The bifurcated soft iron pegs 32 act to retain the platforms in this position until the electro-magnets are deënergized, when the springs 12 return the platforms 11 to their normal position. The deënergization of the electro-magnets also permits the detents to return to their normal position, whereby the detents of deënergized electro-magnets will not be engaged by the bars 29 simultaneously with the detents of energized electro-magnets. As herein shown, the electro-magnets are mounted on the platforms to tilt therewith, but I do not wish to limit myself to this precise arrangement of these parts. A perforation at the end of the music sheet 147 permits finger 277 to engage contact 204 and thus complete a circuit (see Fig. 25) whereby the electro-magnet 199 is energized attracting the arm 195 and breaking the connection between contacts 273 and 274, and consequently the circuit through the electro-magnets 10. When the arm 195 is attracted the spring 197 (see Fig. 10) is placed under stress and the lever 190 is released by reason of lug 194 being drawn out of engagement with shoulder 193 and the lever is moved through the medium of the retractile spring 191. When this lever is thus shifted, three operations are accomplished: first, the bifurcated arm 157 moves the spool 155 upon the shaft 144, and withdraws the pin 154 from the notches 150 of the take-up roll head 149, allowing said roll to rotate freely, as will hereinafter appear, upon the shaft 144.

The second operation performed by the movement of the lever 190 is that of engaging the bell crank lever 216, and causing said lever to strike the extension 217ª of the metallic bar 201, tilting said bar whereby the metallic contact fingers 202 thereof are moved out of engagement with the contacts 204. This movement of the fingers allows the sheet of paper 147 to be freely moved between said fingers and the metallic contact bar, the movement of said fingers also placing the spring 203 under stress, whereby when the extension 217ª is released by the bell crank lever 216, said spring will return the bar 201 to its normal position with the contact fingers thereof in engagement with the contact bar.

The third operation performed by shifting the lever 190 is accomplished through the bifurcated arm 179 and the sleeve 178. (See Figs. 10 and 14). When the lever 190 is shifted as described, the sleeve is moved upon the shaft 159 to place the extension 183 of the lever 180 in one of the openings 185 of the disk 186, and since this disk is carried by the shaft 187, the shaft 159 will be coupled to and revolved in unison with the shaft 187 and the roll of perforated paper 147 will be re-wound upon the music-sheet spool 168. In case there is not sufficient air in the reservoir 59 to operate the bellows 252 and 255, the operator continues to operate the pedals of the player until the sheet of paper 147 has been re-rolled upon the spool 168. The music-sheet spool 168 can then be removed, another placed in position and connected to the take-up roll 145, as heretofore described.

When the lever 190 is shifted, the lug 194 of the arm 195 is held against the cross head 192 of the lever 190 by the spring 197 and remains in this position until the player is to be again placed in operation. Assuming that another roll of music has been placed in the player, the operator grips the knob 190ᵃ of the lever 190 and moves said lever to the right, the lug 194 of the arm 195 engaging in the notch 193 of the cross head 192. This movement of the arm 195 immediately reëstablishes a circuit through the electro-magnets 10. The movement of the lever 190 allows the pin 154 to again engage the head 149 of the take-up roll 145, and the contact fingers 202 to engage the sheet of paper 147, and also disconnects the shaft 187 and 159, whereby the sheet of paper 147 having been attached to the take-up roll will feed from the music-sheet spool on to the take-up roll.

During the rendition of a piece of music, the player mechanism can be stopped by the operator pulling the free end of the arm 195 outwardly toward the front of the drawer, thus releasing the lever 190 and reversing the operation, whereby the sheet of paper 147 will be re-wound from the take-up roll 145 upon the music-sheet spool 168, and the roll of music may then be removed or again played.

It is thought that the operation of the selector mechanism through the medium of the bellows 252 and 255 will be fully understood, and reference will now be had to the pedal mechanism employed for reciprocating the frame and operating the selector mechanism independently of or in unison with said bellows. I have devised the pedal and lever action so that should any part of the bellows fail to act, the pedal and lever action may be used for reciprocating the frame and operating the selector mechanism and vice versa.

When the pedals 54 are actuated to impart a rotary movement to the shaft 37, as previously described, the endless cable or belt 239 imparts a rotary movement to the pulley wheel 238, and this pulley wheel through the medium of the sleeve 236 rotates the shaft 232 irrespective of the position of the selector drawer 138. The shaft 232 through the medium of beveled gear wheels 230 and 231, shaft 228 pinion 227 and gear wheels 222 226 is adapted to rotate the shafts 144 and 187 similar to the bellows heretofore described.

The rotation of the shaft 37 causes the gear wheel 39 to impart an intermittent movement to the small gear wheel 77, (see Figs. 5, 6 and 33) this intermittent movement being accomplished by said gear wheel being stripped of part of its teeth, as at 78, for a purpose that will presently appear. The rod 79 which is eccentrically connected to the gear wheel 77 oscillates the arm 80 (Fig. 7) and rocks the shaft 81; consequently the bars 29 will be vertically reciprocated through the medium of the cranks 82 and the links 83. The gear wheel 77 is stripped of some of its teeth, as at 78, (see Figs. 5, 6 and 33) whereby the retractile springs 29ᵃ will return the reciprocating frame to its normal lowered position each time the teeth of the small gear 77 pass out of engagement with the teeth of gear 39, and the frame will be again elevated by the teeth of the gear wheel 77 meshing with the revoluble gear wheel 39. This operation will be better understood by reference to Fig. 33 wherein the teeth of wheels 39 and 77 are shown as beginning to mesh, and as the wheels continue to revolve, arm 80 is drawn down by rod 79, and the reciprocatory frame 29 is elevated; immediately upon tooth 77ᵃ passing out of engagement with the teeth of wheel 79, the untoothed portions 78 of wheel 77 is brought opposite the wheel 39, unmeshing the teeth of wheels 39 and 77 and permitting the springs 29ᵃ to again lower the reciprocatory frame 29, this lowering movement of the frame 29 taking place while the wheel 77 is traveling around to bring the tooth 77ᵇ thereof into mesh with the teeth of wheel 39. The pivot or wrist pin 77ᶜ (Fig. 33) for this pitman rod 79 is so placed on the wheel 77 as to prevent a dead center. By providing this auxiliary or supplemental means for operating the reciprocating member 29, I insure a positive movement of the member at all times during the operation of the mechanism, the auxiliary or supplemental means acting to actuate the member 29 in case the bellows-operated means fails to work properly. For instance, if during the playing, any part of the bellows 89 becomes defective, the supplemental means referred to serves to continue the operation of the frame and permits continuation of the playing.

Considering now the auxiliary actuating devices used in connection with the player, reference will first be had to Figs. 18 and 23. The sheet of perforated paper 147 is provided with special perforations for allowing a certain contact finger 202 to engage a contact 204 and establish a circuit that will energize the electro-magnet 128. In energizing this electro-magnet 128 the detent thereof is immediately placed in position to be engaged by one of the bars 29 of the reciprocating frame. When the electro-magnet 128 is rocked, the depending stem 126 of the controller valve 123 is elevated, whereby air from the reservoir 59 passing through the duct or tube 122 will pass through ports 120 and 124 into the tube or duct 115, and from said tube or duct into the bellows 111. An expansion of the bellows 111 will elevate the damper rod 71 of the piano. When the electro-magnet 128 is deënergized and returned to its normal position, the valve 123 is lowered, placing the exhaust port 125 in register with the port 117 and closing the port 120, whereby the bellows 111 can exhaust through the duct or tube 115, and ports 117 and 125. The operation of another auxiliary device previously described in detail under the caption of "expression control-mechanism," is as follows: With the reciprocating frame in a lowered position, the two electro-magnets 131 (Fig. 4) are energized by a circuit similar to that of the electro-magnet 128. The armature bars 132 are moved to engage the bars 134 and hold said bars during an elevation of the reciprocating frame, whereby when said reciprocating frame is again lowered, it will be moved down forcibly through the action of the springs 136, these springs coöperating with the springs 29ᵃ. When the electro-magnets 131 are deënergized the armature bars 132 are immediately returned to their normal position, releasing bars 134 and allowing the springs 136 to assume their normal position.

It will be observed that the actuating contrivances can be used in connection with the ordinary pedals of a piano for obtaining certain expressions to be indicated by signs or marks upon the perforated sheet of paper, to notify the operator of the player that certain pedals are to be depressed to obtain desirable effects, known to musicians as "phrasing" or "shading".

While in the drawings forming a part of this application there is illustrated the preferred embodiments of my invention, it is to be understood that the same can be varied or changed as to shape, proportion and manner of assemblage without departing from the spirit of the invention.

Having now described my invention what I claim as new, is:—

1. A piano player comprising tiltably-mounted key-actuators, connections between said actuators and the keys of a piano, means for tilting said key-actuators including electro-magnets, a source of electrical energy for said magnets, a selector mechanism in circuit with said magnets and controlling the energizing thereof, and a pneumatic motor-mechanism for operating said selector mechanism.

2. A piano player comprising tiltably-mounted key-actuators, connections between said actuators and the keys of a piano, a reciprocatory frame for tilting said actuators, a bellows mechanism and connections therewith to reciprocate said frame, a pedal and lever action also operating in conjunction with said bellows mechanism to reciprocate said frame, electro-magnets controlling said key-actuators, a source of electrical energy for said magnets, a selector mechanism in circuit with said magnets and controlling the energizing thereof, and a motor for operating said selector mechanism.

3. A piano player comprising a plurality of tiltably-mounted key-actuators, means whereby the keys of a piano are actuated by the tilting of the actuators, a reciprocatory frame for tilting said actuators, electro-magnets and connections actuated thereby for selectively controlling the engagement of the frame with the actuators, a source of electrical energy for said magnets, a selector mechanism in circuit with said magnets for controlling the energizing thereof, a pneumatic motor mechanism for operating said selector mechanism, a bellows connected to reciprocate said frame, and a pedal and lever mechanism operable independently of or simultaneously with said bellows for reciprocating said frame.

4. A piano player comprising a plurality of tiltably-mounted key-actuators, means whereby the keys of a piano are actuated by the tilting of the actuators, a reciprocatory frame for tilting said actuators, a bellows connected to reciprocate said frame, electro-magnets and connections operated thereby for selectively controlling the engagement of the frame with the actuators, a source of electrical energy for said electro-magnets, a selector mechanism in circuit with said magnets for controlling the energizing thereof, a motor connected to operate said selector mechanism, and a pedal and lever mechanism operable independently of or simultaneously with said motor for operating said selector mechanism.

5. A player mechanism for pianos comprising in combination, tiltably-mounted key-actuators, means whereby the keys of a piano are actuated by the tilting of said actuators, a reciprocatory frame for tilting said actuators, means for imparting reciprocatory movement to said frame, means for temporarily holding the actuators in the position to which they are moved by said frame, electro-magnets and connections actuated thereby for selectively controlling the engagement of the frame with the actuators, a source of electrical energy for energizing said magnets, a selector mechanism in circuit with said magnets and controlling the energizing thereof, and means for operating said selector mechanism.

6. A piano player comprising movably-mounted key-actuators, means whereby the keys of a piano are actuated by the moving of said actuators, means for operating said actuators including a reciprocatory frame and means for reciprocating the same, means for temporarily holding the actuators in the position to which they have been moved by said frame, electro-magnets and connections actuated thereby for selectively controlling the engagement of the frame with the actuators, a source of electrical energy for energizing said magnets, a pedal and lever mechanism and a bellows mechanism operable independently of or simultaneously with the operating means for the key-actuators, and a selector mechanism in circuit with said magnets and controlling the energizing thereof.

7. A piano player comprising movably-mounted key-actuators, means whereby the keys of a piano are actuated by the moving of said actuators, means for operating said actuators, electro-magnets and connections actuated thereby for selectively controlling the engagement of the actuator operating means with the actuators, a source of electrical energy for said magnets, means for holding the key-actuators while the electro-magnets are energized in the position to which said actuators have been moved, a selector mechanism in circuit with said magnets and controlling the energizing thereof, and means for operating said selector mechanism.

8. A piano player comprising movably mounted key-actuators, means whereby the keys of a piano are actuated by the moving of said actuators, a reciprocatory frame for moving said actuators, a bellows mechanism and connections therewith to reciprocate said frame, electro-magnets and connections actuated thereby for selectively controlling the engagement of the frame with the actuators, a source of electrical energy for said magnets, a selector mechanism in circuit with said magnets and controlling the energizing thereof, a motor for operating said selector mechanism, and means for holding the key-actuators while the electro magnets are energized in the position to which said actuators have been moved by the reciprocating frame.

9. A piano player comprising tiltably-mounted key-actuators, an electro-magnet on each actuator, a source of electrical energy for said electro-magnets, a reciprocatory frame, detents controlled by said electro-magnets and mounted on said key-actuators to project when the electro-magnets are energized into the path of travel of said frame to be engaged thereby, and a pedal and lever mechanism having connection with said frame for reciprocating the latter.

10. A piano player comprising tiltably-mounted key-actuators, an electro-magnet for each actuator, a source of electrical energy for said electro-magnets, a reciprocatory frame, detents controlled by said electro-magnets and mounted on said key-actuators to project when the electro-magnets are energized into the path of travel of said frame to be engaged thereby, a pedal and lever mechanism having connection with said frame for reciprocating the latter, and a bellows having connection with said frame for operating the same.

11. A player for pianos embodying tiltably-mounted actuators, means whereby the hammers of a piano are actuated by the tilting of said actuators, a reciprocatory frame for tilting said actuators, a bellows mechanism and connections therewith to reciprocate said frame, electro-magnets and connections actuated thereby for selectively controlling the engagement of the frame with the actuators, a source of electrical energy for said magnets, detents controlled by said electro-magnets, means operable upon the energizing of said magnets for placing the detents in position to be engaged by said frame, a selector mechanism in circuit with said magnets and controlling the energizing thereof, and means for operating said selector mechanism.

12. A piano player comprising in combination, tiltably-mounted key-actuators, means whereby the keys of a piano are actuated by the tilting of said actuators, a reciprocating frame for tilting said actuators, a pedal and lever mechanism and connections therewith for reciprocating said frame, electro-magnets and connections actuated thereby for selectively controlling the engagement of the frame with the actuators, a source of electrical energy for said magnets, and means for controlling the energizing of said magnets in their order.

13. A piano player comprising in combination, tiltably-mounted hammer actuators, a reciprocatory frame for tilting said actuators, a bellows mechanism and connections therewith to reciprocate said frame, electro-magnets and connections actuated thereby for selectively controlling the engagement of the frame with the actuators, a source of electrical energy for said magnets, and a selector mechanism in circuit with said magnets and controlling the energizing thereof 14. A piano player comprising in combination, actuating-rods, tiltable actuators for actuating said rods, a reciprocatory frame for tilting said actuators, electro-magnets and connections actuated thereby for selectively controlling the engagement of the frame with the actuators, a source of electrical energy for said electro-magnets, a bellows mechanism and connections with said frame to reciprocate the same, a damper control mechanism and connections with said bellows mechanism for operating the damper control mechanism, an expression-control mechanism and connections with said damper control mechanism, a selector mechanism controlling the operation of said expression control mechanism, and means for operating said selector mechanism.

15. A piano player comprising in combination, actuating rods, tiltable actuating-means for each rod, a reciprocatory frame for tilting said actuating-means, electro-magnets and connections actuated thereby for selectively controlling the engagement of the frame with the actuating means, a selector mechanism, a source of electrical energy for said magnets and in circuit with said selector mechanism, an expression control mechanism controlled by said selector mechanism, a bellows and connections with said reciprocatory frame for reciprocating the latter, and a damper control mechanism connected with said bellows mechanism.

16. A piano player comprising in combination, actuating-rods, tiltably-mounted actuators for actuating said rods, a reciprocatory frame for tilting said actuators, electro-magnets and connections actuated thereby for selectively controlling the engagement of the frame with the actuators, a source of electrical energy for said magnets, a selector mechanism controlling the energizing of said magnets, a bellows action and connections with said frame to reciprocate the latter, and an expression control mechanism connected with said bellows mechanism.

17. A piano player comprising in combination, key-actuating rods, two rows of tiltably-mounted key-actuators for actuating said rods, a reciprocatory frame for tilting said actuators, electro-magnets and connections actuated thereby for selectively controlling the engagement of the frame with the actuators, a source of electrical energy for said electro-magnets, a selector mechanism controlling the energizing of said magnets, a pedal and lever mechanism for reciprocating the frame, a bellows mechanism operable independently of or simultaneously with the pedal and lever mechanism for reciprocating the frame, and a damper control mechanism and connections with the pedal and lever mechanism and the bellows mechanism.

18. A piano player comprising in combination key-actuating rods, two parallel rows of tiltably-mounted key-actuators for actuating said rods, a reciprocatory frame for tilting said key-actuators, electro-magnets and connections actuated thereby for selectively controlling the engagement of the frame with the key-actuators, a source of electrical energy for energizing said magnets, a movable selector mechanism in circuit with said magnets and controlling the energizing of the magnets, devices for temporarily holding said actuators in the tilted position to which they have been moved by said frame, a pedal and lever mechanism and connections for reciprocating said frame, and a bellows mechanism operating simultaneously with the pedal and lever mechanism for reciprocating said frame.

19. A piano player comprising in combination, key-actuating rods, two parallel rows of tiltably-mounted key-actuators for actuating said rods, a reciprocatory frame for tilting said key-actuators, electro-magnets and connections actuated thereby for selectively controlling the engagement of the frame with the key-actuators, a source of electrical energy for energizing said magnets, devices for temporarily holding the actuators in the position to which they have been moved by said frame, a pedal and lever mechanism and connections for reciprocating the frame, an expression control mechanism and connections with said pedal and lever mechanism, a movable selector mechanism in circuit with said magnets and controlling the energizing thereof, and means for operating the selector mechanism.

In testimony whereof I affix my signature in the presence of two witnesses.

JOHN F. WHITE.

Witnesses:
MAX H. SROLOVITZ,
K. H. BUTLER.